2,946,663
PREPARATION OF DIBORANE

Carl D. Good, Niagara Falls, N.Y., assignor, by mesne assignments, to Olin Mathieson Chemical Corporation, a corporation of Virginia No Drawing. Filed Jan. 6, 1956, Ser. No. 557,633

2 Claims. (Cl. 23—204)

This invention relates to a new method for the production of diborane.

It has heretofore been proposed to produce diborane by reacting boron trifluoride and lithium hydride in ether solution. This method suffers from various disadvantages from the standpoint of the materials involved. For example, the method employs lithium hydride, a hydride of a metal which is not commercially available in large quantities at reasonable cost. It would be desirable, therefore, to have available a method for the production of diborane based upon the use of a hydride of a metal which is readily available in commercial quantities at reasonable cost, such as aluminum. Moreover, the known method is based upon the use of boron trifluoride and does not involve the use of boron trichloride a material which the art knows how to produce by passing chlorine gas through a mixture of boric oxide and carbon at elevated temperatures.

I have now devised a method whereby diborane can be produced in good yield in a controllable reaction employing a hydride of a metal which is readily available in commercial quantities at a reasonable cost, i.e., a hydride of aluminum. The process of my invention, moreover, involves the use of boron trichloride as the source of the boron present in the diborane produced.

According to the process of my invention for the production of diborane, boron trichloride is introduced into a slurry of aluminum hydride in benzene, a lower alkylated benzene or a mixture thereof.

Although aluminum hydride has never been isolated except in the form of a highly polymerized compound, an aluminum hydride in the form of a stable etherate may be readily prepared and is satisfactory for use in the process of my invention. The aluminum hydride etherate may be derived, for example, from lithium aluminum hydride prepared according to the following equation:

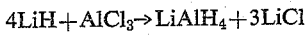

$$4LiH + AlCl_3 \rightarrow LiAlH_4 + 3LiCl$$

The lithium aluminum hydride can then be reacted with aluminum chloride in ether solution to form lithium chloride and a solution of aluminum hydride in ether. This solution of aluminum hydride can be evaporated to form a stable etherate, $3AlH_3 \cdot Et_2O$. Sodium may be substituted for lithium in the above equations and the aluminum hydride etherate may also be prepared from sodium aluminum hydride.

The lower alkylated benzenes useful in the process of my invention as the reaction medium in which the aluminum hydride is slurried are those containing a total of not more than six carbon atoms in the alkyl radical. These include, for example, toluene, ethyl benzene, n-propyl benzene, cumene, 1,2-diethyl benzene, 1,3-diethyl benzene, 1,4-diethyl benzene, 1,3,5-triethyl benzene, 1,3-dimethyl-5-propyl benzene, p-cymene, or mixtures thereof.

The following examples illustrate in detail various embodiments falling within the scope of my invention.

The reactor used in all reactions described in this specification was a 125 ml. flask attached to a high vacuum line through a reflux condenser which was cooled to $-78°$ C. The reactants were stirred with a magnetic stirring bar. In all examples the boron trichloride was measured in a calibrated portion of the vacuum line and then condensed onto the reactants.

The aluminum hydride etherate for the reactions other than that described in Example III was prepared as described below. A solution of 6.3 grams of lithium aluminum hydride in 300 ml. of diethylether was diluted with an additional pound of ether in a 2,000 ml. flask cooled in an ice bath. 6.5 grams of aluminum chloride was slowly added to the solution at 0° C. with constant agitation. The cooled reaction mixture was filtered immediately after addition of the aluminum chloride to remove the by-product lithium chloride. The clear filtrate was then subjected to a vacuum until the last traces of liquid had disappeared. An active hydrogen determination of the white residue indicated that the sample was 47.2 weight percent aluminum hydride.

Example I

In this example, 0.00876 mole of aluminum hydride in the form of an etherate was added to 10 ml. of dry benzene. The 125 ml. flask was connected to the vacuum line and was cooled to $-196°$ C. by a liquid nitrogen bath. The flask was evacuated and closed off from the vacuum line. A total of 0.0104 mole of boron trichloride was measured in the vacuum line and subsequently condensed onto the solid slurry of benzene and aluminum hydride. The slurry was warmed to room temperature and an immediate reaction occurred as evidenced by a pressure increase in the system and a yellowing of the reaction slurry. In the course of the hour long reaction, the boron trichloride refluxed in the $-78°$ C. condenser and dripped onto the reaction slurry. The diborane was measured in a known volume of the vacuum line and analyzed by means of the infrared spectrometer. A 78 percent yield of diborane (.0034 mole of diborane) based on the aluminum hydride was obtained from this reaction. An analysis of the residue indicated that less than 0.6 percent of the original active hydrogen remained in the reaction flask.

Example II

In this example 0.0161 mole of aluminum hydride etherate was slurried in 10 ml. benzene and the flask evacuated as described in Example I. A total of 0.0413 mole of boron trichloride was condensed into the slurry and the mixture was then warmed to room temperature. After a reaction time of approximately 70 minutes, a 76 percent yield of diborane based on the aluminum hydride was obtained. The diborane thus obtained was contaminated with chloroboranes probably because of the large excess of boron trichloride in this reaction.

It was noted in the reactions in which benzene was used that fresh aluminum hydride was necessary for high yields of diborane. The yields fell off as the aluminum hydride aged. If desired, the diborane may be purified by fractional condensation.

Example III

In this example 25 ml. of tetrahydrofuran solution containing 0.58 g. of sodium aluminum hydride was placed in the flask and cooled to $-78°$ C. A total of 0.4820 g. of aluminum chloride was added to the solution. After the aluminum chloride was added to the solution, the cooling bath was removed and the reaction mixture stood at room temperature for three days. At the end of that time, the flask was connected to a vacuum line and the tetrahydrofuran was pumped off. The solid was slurried in the flask with 15 ml. of dry benzene. Then the slurry was frozen by immersion of the flask in a Dewar filled with liquid nitrogen and the flask evacuated. A total of 0.0134 mole of boron trichloride was condensed onto the reactants which were then warmed. After a reaction time of one hour, the products were collected and analyzed. A yield of diborane of 11.4 percent based on the aluminum hydride was obtained.

This example indicates that yields are lower when the sodium chloride formed in the reaction of sodium aluminum hydride and aluminum chloride is not removed from the reaction system prior to the reaction of the aluminum hydride with boron trichloride.

In a separate reaction, 0.00903 mole of the aluminum hydride etherate was placed in the flask which was connected to the vacuum line. No solvent was used. A total of 0.0107 mole of boron trichloride was condensed onto the solid. The reactants were warmed to room temperature and the boron trichloride refluxed over the aluminum hydride. Diborane was produced immediately in an exothermic reaction. The aluminum hydride was decomposed in the area of the refluxing liquid boron trichloride. This was evidenced by a blackening of the hydride and the very intense heat and presumably was due to the exothermic reaction mentioned above. After a 65 minute reaction time, a 38 percent yield of diborane based on the aluminum hydride was obtained, which indicates that the yields of diborane are much lower when the aluminum hydride is not slurried in the reaction medium of benzene.

In an additional reaction, 0.00823 mole of the aluminum hydride etherate was added to 10 ml. of diethyl ether. A total of 0.0111 mole of boron trichloride was condensed onto the degassed solid slurry. The reactants were warmed to room temperature and allowed to react for 150 minutes. Only a trace of diborane was obtained, an indication that diethyl ether is not a satisfactory reaction medium.

Various modifications can be made in the procedures of the specific examples to provide other embodiments which fall within the scope of my invention. These specific examples illustrate that the relative proportions of aluminum hydride, boron trichloride and the reaction medium can be varied considerably. In general, however, a reaction mixture will contain from 0.025 to 1.00 mole of aluminum hydride per 100 ml. of reaction medium (benzene or equivalent). Also, in general, from 0.2 to 3 moles of boron trichloride per mole of aluminum hydride is introduced into the reaction mixture. The reaction temperature will generally be within the range of from 0 to 120° C.

I claim:

1. A process for the production of diborane which comprises reacting boron trichloride with a slurry of aluminum hydride at approximately room temperature in a reaction medium selected from the group consisting of benzene and alkyl benzenes having a total of not more than six carbon atoms in the alkyl radical, and recovering diborane from the reaction mixture.

2. A process for the production of diborane which comprises reacting boron trichloride with a slurry of aluminum hydride etherate at approximately room temperature in a reaction medium selected from the group consisting of benzene and alkyl benzenes having a total of not more than six carbon atoms in the alkyl radical, and recovering diborane from the reaction mixture.

References Cited in the file of this patent

Hurd: "Chemistry of the Hydrides," pages 87 and 166 (1952), John Wiley & Son, N.Y.

Schechter et al.: "Boron Hydrides and Related Compounds," January 8, 1951, page 22, declassified January 5, 1954; Bureau of Aeronautics, Dept. of the Navy.